(12) United States Patent
Moseshvili

(10) Patent No.: US 6,481,859 B1
(45) Date of Patent: Nov. 19, 2002

(54) RADIANT ENERGY CONCENTRATOR

(75) Inventor: Aleksandre Moseshvili, ap.I, Kavtaradze str.28, Tbilisi 380086 (GE)

(73) Assignees: Levan Tsintsadze, Tbilisi (GE); Aleksandre Moseshvili, Tbilisi (GE)

( * ) Notice: Subject to any disclaimer, the term of this patent is extended or adjusted under 35 U.S.C. 154(b) by 0 days.

(21) Appl. No.: 09/743,988

(22) PCT Filed: Mar. 20, 2001

(86) PCT No.: PCT/GE99/00006

§ 371 (c)(1),
(2), (4) Date: Mar. 9, 2001

(87) PCT Pub. No.: WO00/05604

PCT Pub. Date: Feb. 3, 2000

(30) Foreign Application Priority Data

Jul. 21, 1998 (GE) .............................................. 003167
Jun. 16, 1999 (GE) .............................................. 003526

(51) Int. Cl.[7] .............................................. G02B 5/10
(52) U.S. Cl. ..................... 359/853; 359/850; 359/854; 359/855; 359/851
(58) Field of Search ................................. 359/853, 850, 359/854, 855, 856, 851; 126/270, 271, 653; 136/253, 246

(56) References Cited

U.S. PATENT DOCUMENTS

| | | | | |
|---|---|---|---|---|
| 4,223,174 A | * | 9/1980 | Moeller | 136/246 |
| 4,385,808 A | * | 5/1983 | Vandrwerf | 350/452 |
| 5,538,563 A | * | 7/1996 | Finkl | 136/246 |
| 5,727,585 A | * | 3/1998 | Daume et al. | 136/246 |
| 5,932,029 A | * | 8/1999 | Stone et al. | 136/253 |

* cited by examiner

Primary Examiner—Mohammad Sikder
(74) Attorney, Agent, or Firm—Nath & Associates PLLC; Gary M. Nath; Marvin C. Berkowitz

(57) ABSTRACT

A receiving layer of a radiant energy concentrator has a set of collecting members arranged on a same level. In one embodiment upper edges of the members form a hexagonal honeycomb structure in a plane, and in another embodiment the members form an orthogonal matrix of square shaped elements. In the hexagonal honeycomb structure the collecting members are made in the form of funnels with reflective internal surfaces, and in the orthogonal matrix the collecting members are optical lenses or made in the form of paraboloidal-hyperboloidal concentrators. Layers having reflectors are provided under the receiving layer. Light beams from peripheral collecting members are transmitted by reflectors disposed under the receiving layer to a center of a central member. Successive layers further concentrate receiving light beams in a similar manner.

19 Claims, 5 Drawing Sheets

RADIANT ENERGY CONCENTRATOR

FIELD OF THE INVENTION

This invention pertains to: solar-energy technology and more specifically to the field of light radiation energy concentrators and can be used as conversion means of radiant energy into thermal or electrical energy; astronomy, wherein it can be used in designing the powerful telescopes, intended for collecting the weak light beams coming from the distant galaxies; and high energy physics where it can be utilized for obtaining strong laser beams.

BACKGROUND OF THE INVENTION

Considered to be relevant to the present invention are diverse types of funnel-shaped concentrators, in particular, truncated pyramid-shaped concentrator [Andreev V. M., Grilikhes V. A. rumiancev V. D. Photo-electricheskoe preobrazovanie koncentrirovannogo solnechnogo izluchenia. Leningrad "NAUKA" 1989 pp. 206–213 (Rus)], and so-called paraboloidal focon [Andreev V. M., Grilikhes V. A. rumiancev V. D. Photo-electricheskoe preobrazovanie koncentrirovannogo solnechnogo izluchenia. Leningrad "NAUKA" 1989 pp. 220–222 (Rus)]. The truncated pyramid—shaped concentrator is a pyramid having truncated top portion, thin walls, and internal reflecting surface, whose wide portion being directed to the light source. The disadvantage of the truncated pyramid-shaped concentrator is low concentrating capability, big dimensions and the fact that it comprises the solar cells not protected from the cosmic radiation. The walls of the paraboloidal focon are paraboloid-shaped and its disadvantage is similar to that of the truncated pyramid-shaped concentrator.

The most relevant subject to the present invention is considered a paraboloidal-hyperboloidal concentrator [Andreev V. M., Grilikhes V. A. rumiancev V. D. Photoelectricheskoe preobrazovanie koncentrirovannogo solnechnogo izluchenia. Leningrad "NAUKA" 1989 pp. 278–300 (Rus)]. The paraboloidal-hyperboloical concentrator comprises a combination of one primary paraboloidal mirror and one secondary hyperboloidal mirror. The disadvantage of the paraboloidal-hyperboloical concentrator is that it cannot be operated unless precise taking aim at the source of beams. The radius of the secondary mirror determines the protection ability of a solar cell against damaging cosmic radiation which on the other hand causes the reduction of the primary mirror's operating area; The height of the concentrator depends on the area which is held by the paraboloidal mirror.

SUMMARY OF THE INVENTION

Technical result of the present invention is the reduction of mass and overal dimensions of the concentrator; lack of the necessity of taking a precize aim at the source of a light beams; and the maximum protection of the solar cells against the damaging cosmic radiation.

The device of the present invention includes: funuelshaped concentrators; collecting lenses, and the concentrators comprising paraboloidal-hyperboloidal reflectors.

The essence of the present invention which allows to avoid the disadvantages of the above described later concentrator and permitting to achieve the technical result lies in that the reflectors of the layers arranged under the beams receiving layer provide collection at the center of the beams coming out of the peripheral outlets available on the preceding layer, thereby allowing to achieve high level of concentration and significant decrease in overall dimensions of the entire construction. In case of combined construction of the paraboloidal-hyperboloidal concentrators of the receiving layer decrease in the radius of the secondary mirror becomes possible and consequently maximum utilization of the radiant energy. In case of utilizing the suggested concentrator for the purposes of photoelectric transformation the solar cells get maximum protection against the damaging cosmic radiation as they are arranged under the layers.

BRIEF DESCRIPTION OF THE DRAWINGS

The present invention can be described referring to the following figures.

DETAILED DESCRIPTION OF THE DRAWINGS

Figure 1:
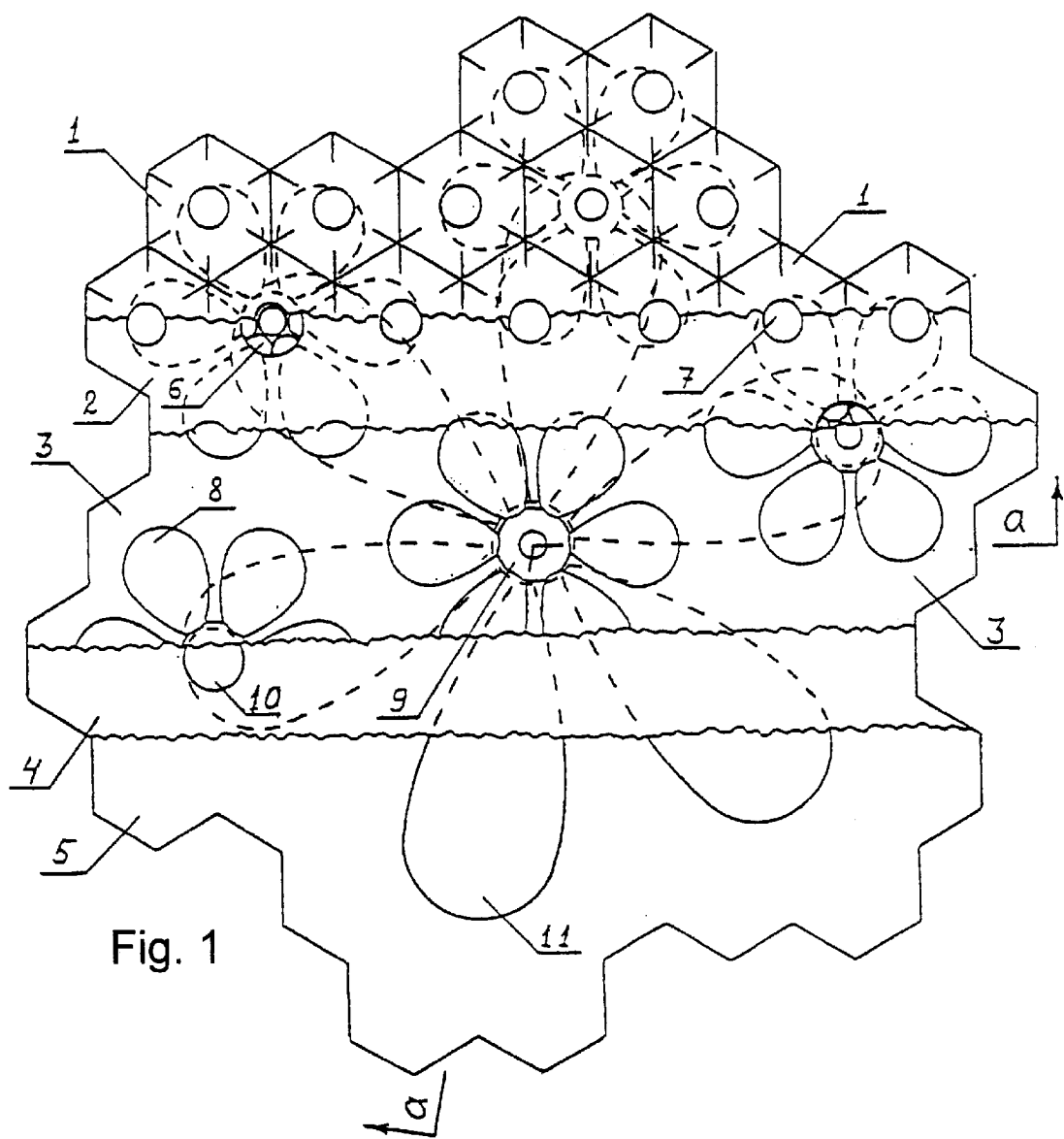
FIG. 1 being a top view of the concentrator provided with funnel-shaped members arranged in a hexagonal honeycomb manner.
Figure 2:
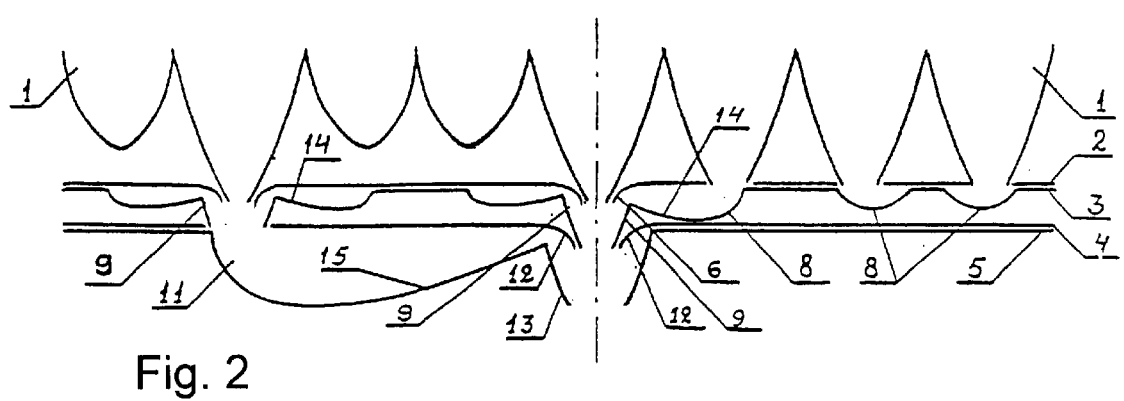
FIG. 2 being a sectional view of the concentrator provided with funnel-shaped members arranged in a hexagonal honeycomb manner.
Figure 3:
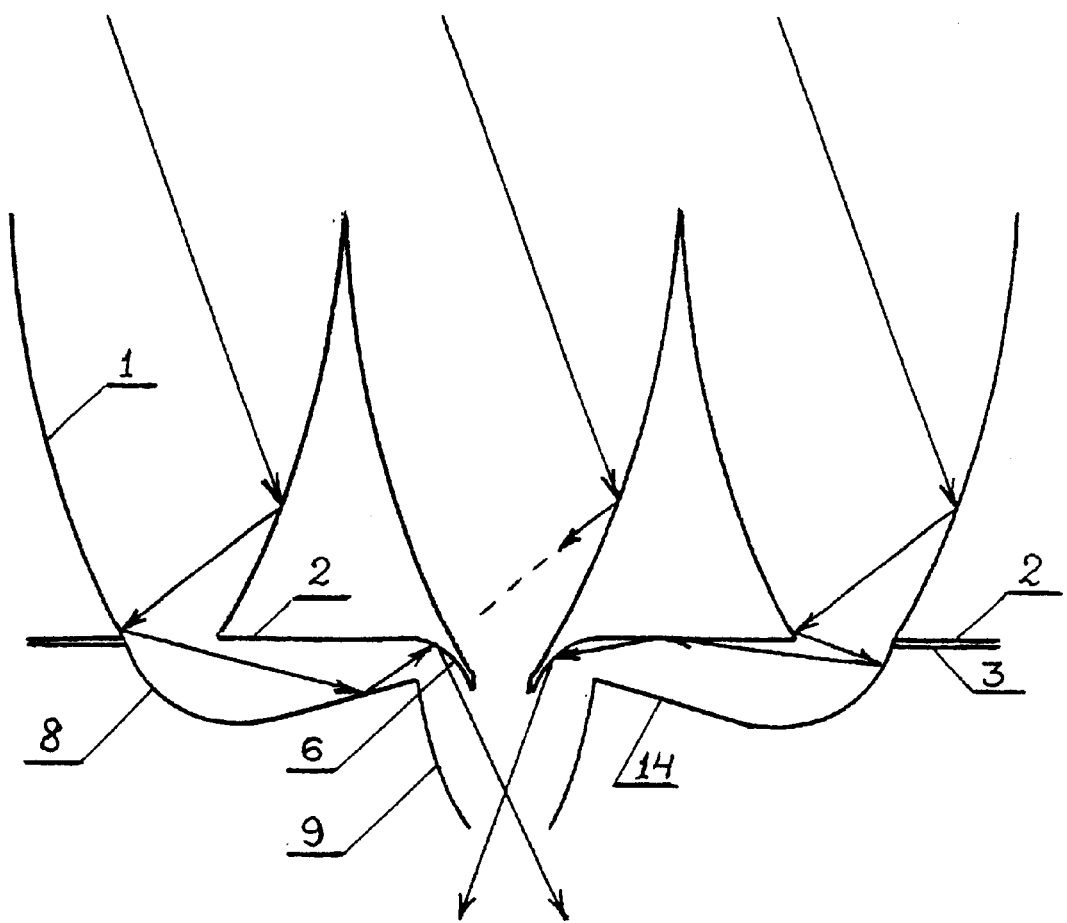
FIG. 3 showing the combination of the layer provided with funnel-shaped members and reflectors, and functional connections between them.
Figure 4:
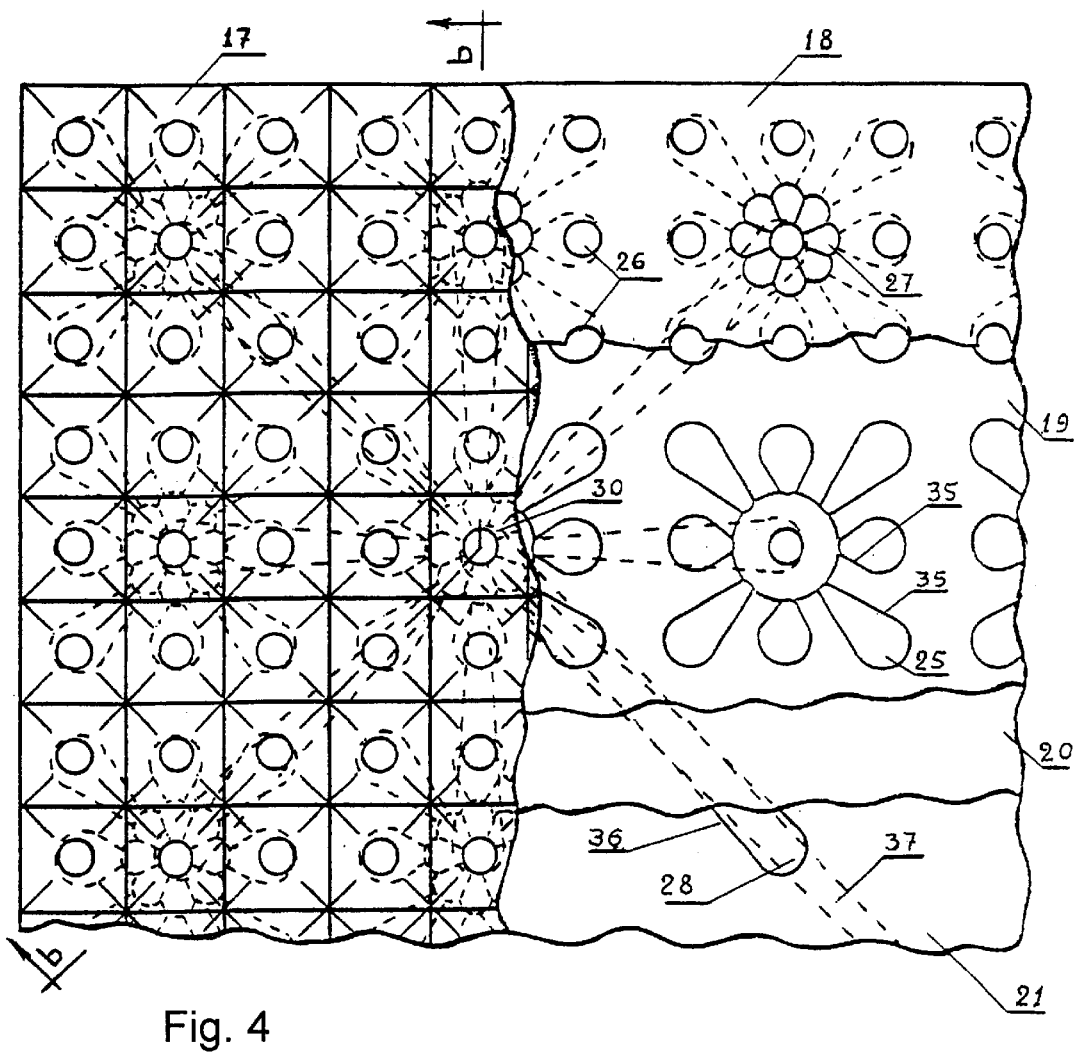
FIG. 4 being a top view of the concentrator comprising orthogonally arranged lenses and funnel-shaped members.

The concentrator which can be seen on FIGS. 1–3, having in hexagonal honeycomb manner arranged funnel-shaped members, comprises: a receiving layer 1 composed of the set of funnel-shaped members; first and second layers arranged under the receiving layer each having one upper and one lower plates; upper plate 2 of the first layer, having a reflective rear surface and holes 7 and intermediate reflectors 6; lower plate 3 of the first layer, having peripheral reflectors 8, canals 14 provided with reflective surfaces, and disposed at the connection point of said canals a funnel 9 with internal reflective surface; upper plate 4 of the second layer, with reflective rear surface, having holes 10 and intermediate reflectors 12; and a lower plate 5 of the second layer having peripheral reflectors 11, canals 15 provided with reflective surfaces, and disposed at said canals connecting point a funnel 13 with an internal reflective surface. The outline of the concentrator is followed by the number of the layers and each particular outline is compatible with the same outline.

The concentrator which can be seen on FIGS. 4–7, having orthogonally arranged funnel-shaped members, comprises: a set of square-shaped collecting lenses 16, orthogonally arranged funnel-shaped members 17; a first, second and third layers provided under the receiving layer each having one upper and one lower plates; upper plate 18 of the first layer, provided with intermediate reflectors 27 and holes 26, and having reflective rear surface; lower plate 19 of the first layer, having peripheral reflectors 25 and canals 35 with reflective surfaces; upper plate 20 of the second layer with reflective rear surface, having intermediate reflectors 29 and holes; lower plate 3 of the second layer, having peripheral reflectors 28 and canals 36 with reflective surfaces 36; upper plate 22 of the third layer with reflective rear surface having intermediate reflectors and holes; lower plate 23 of the third layer, having peripheral reflectors 30 and canals provided with reflective surfaces; and collecting members outlet lenses 24; wherein the holes 26 on the plate 18 are in coincidence with the outlets of the peripheral funnels, the intermediate reflectors 27 are arranged about central collecting member's outlet of the receiving layer, the peripheral reflectors 25 on the plate 19 are in coincidence with the holes 26 in the plate 18, the peripheral reflectors 25 on the plate 19 are connected with the intermediate reflectors 27 on the plate 18, by means of the reflective surface containing canals 35, the reflectors 28 on the plate 21 are connected with the intermediate reflectors 29 on the plate 20, by means of the reflective surface containing canals 36, the peripheral reflector 30 on the plate 23 is in coincidence with the hole in the plate 22.

Figure 5:
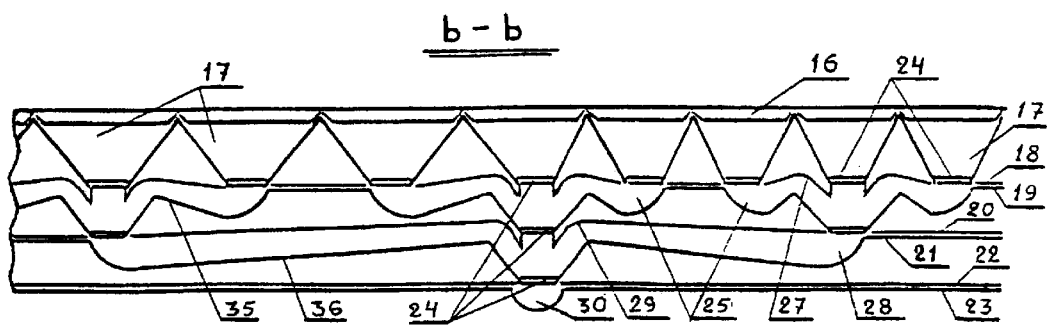
FIG. 5 being a sectional view of the concentrator comprising orthogonally arranged lenses and funnel-shaped members.
Figure 6:
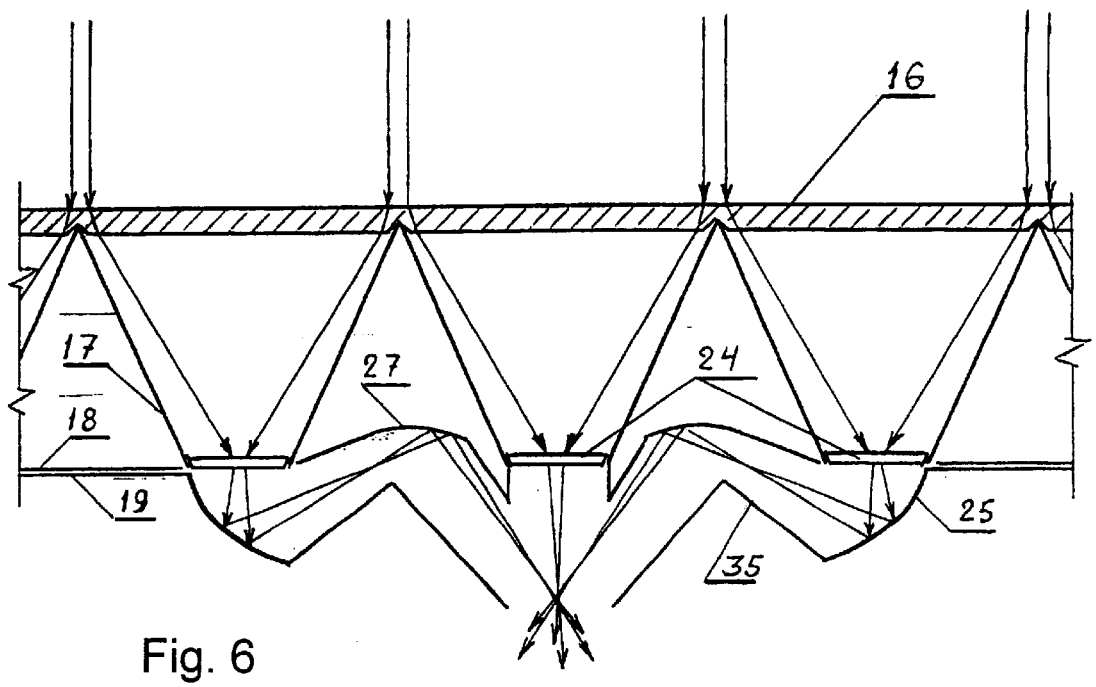
FIG. 6 showing one embodiment of the concentrator comprising funnel-shaped collecting members and Fresnel lenses not necessarily required to be aimed the source of beams.

In an embodiment of the concentrator shown on the FIGS. 5 and 6 the Fresnel lenses are used. In this embodiment, non-precise aiming, at the source of light is provided for. The Fresnel lenses arranged at the outlets of the collecting members 17 permit choosing, of divergence of the beams coming from the focus. Top edges of the collecting members 17 are square-shaped and they are becoming round towards the direction of the outlet. Reflective surface containing canals 35 play an auxiliary role in case of non-precise precise aiming while inclining the focus from the geometrical center of the outlet.

Figure 7:
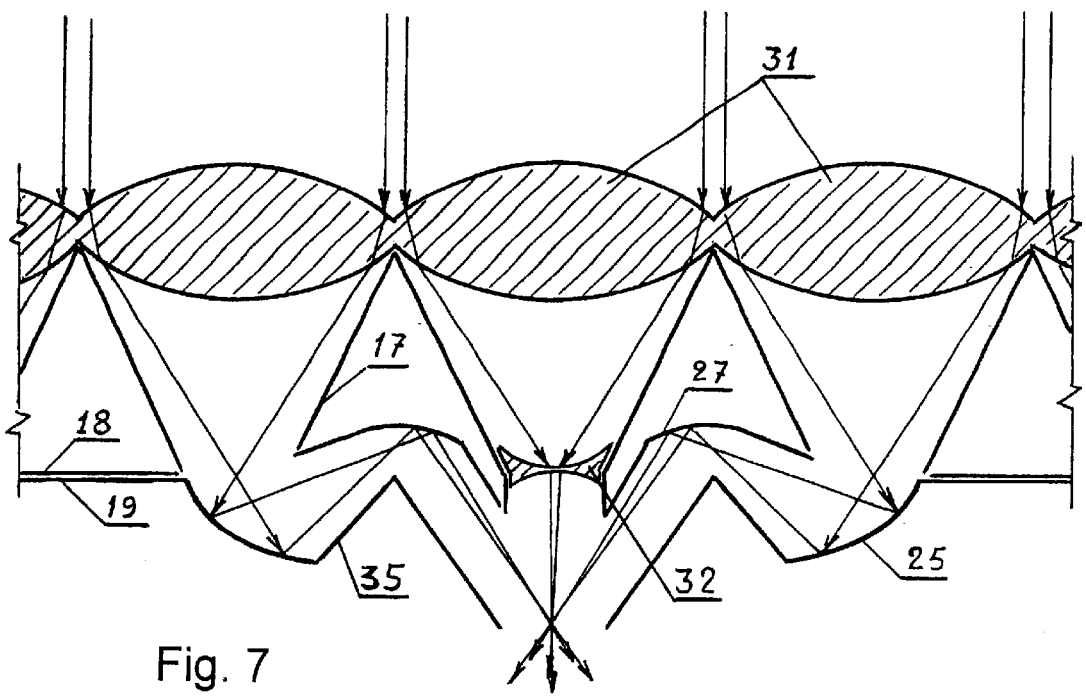
FIG. 7 showing the same concentrator provided with conventional optical lenses.

On the FIG. 7 it can be seen an embodiment of the present invention where the conventional lenses are used as inlet lenses 31 and outlet lenses 32. There are no lenses at the outlet of the peripheral members.

Figure 8:
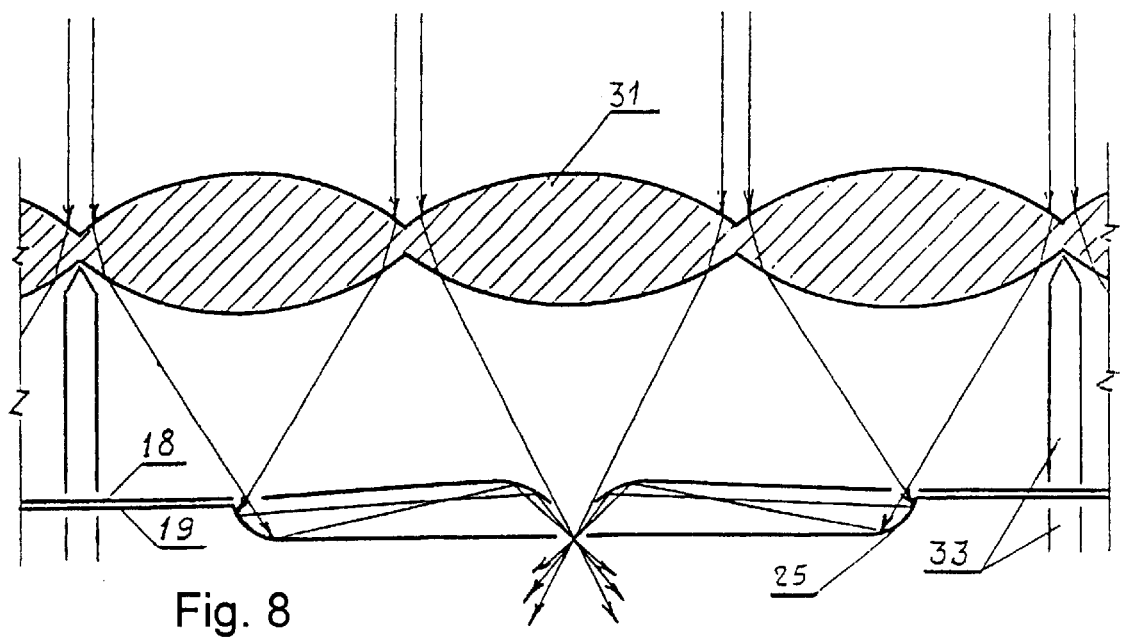
FIG. 8 showing an embodiment of the concentrator provided with conventional optical lenses necessary to be precisely aimed at the source of beam.

In an embodiment shown on the FIG. 8 there is no funnel-shaped members and precise aiming at the source of beams is provided such that the focus is located in the zone of the hole of the layer which is opposite the lens. The plurality of lenses are rested upon the supports 33.

Figure 9:
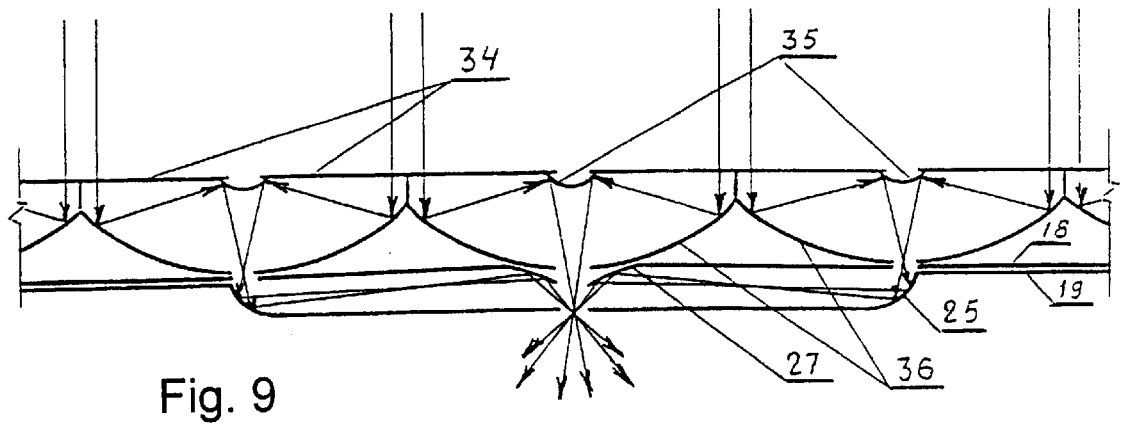
FIG. 9 being a sectional view of the concentrator comprising paraboloidal-hyperboloidal reflectors.

On the FIG. 9 it can be seen an alternative embodiment of the light beams concentrator comprising paraboloidal and hyperboloidal reflectors. In this embodiment, the paraboloidal and hyperboloidal reflectors are facing one another with their operating surfaces, the hyperboloidal reflectors being in engagement by holders 34.

The reflectors containing layer which is located under the receiving layer comprises paraboloidal reflectors 25 and 27.

Figure 10:
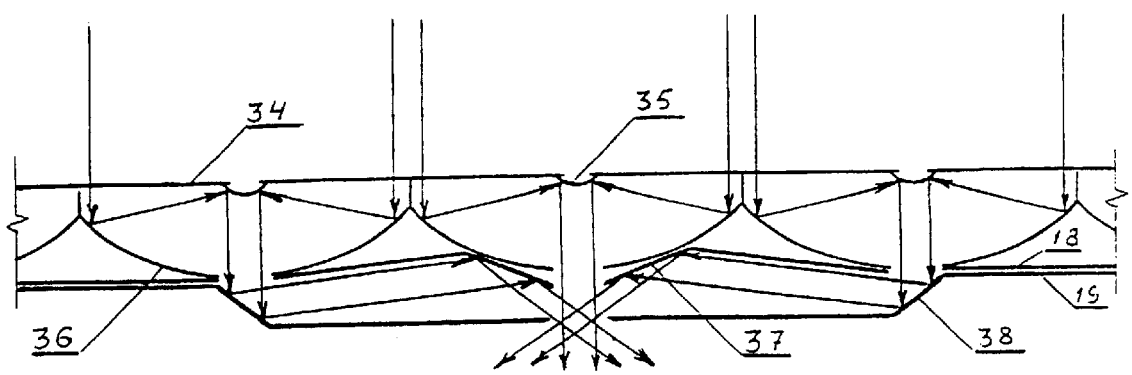
FIG. 10 showing a sectional view of the concentrator, comprising paraboloidal-hyperboloidal reflectors based on parallel, beams transmission

On the FIG. 10 it can be seen a concentrator provided with receiving layer and composed of a set of paraboloidal-hyperboloidal concentrators. The concentrator is capable of transmitting parallel beams. A reflector containing layer disposed under the receiving layer comprises flat reflectors 37 and 38.

In the case of hexagonal honeycomb arrangement of the receiving layer the upper edges of the funnel-shaped members are hexagonal, narrowing at the outlet end and gradually taking round shape. The funnel-shaped members are grouped such that six peripheral members are arranged about a central member of each seven member. Layers are provided under the receiving layer, which layers are provided with reflectors and canals with reflective surfaces thereon. Each layer is composed of one upper plate and one lower plate. The upper plate has reflective surface from underneath and is provided with holes and intermediate reflectors. The lower plate comprises peripheral reflectors and canals with reflective surfaces thereon. The holes of the upper plate are in coincidence with the outlets of the peripheral funnel-shaped members of the receiving layer, and the intermediate reflectors of the upper plate are arranged around the outlet of each central member of the receiving layer. The peripheral reflectors of the lower plate are in coincidence with the holes in upper plate, and the reflective surface containing canals connect the reflectors of the lower plate to the intermediate reflectors of the upper plate. Jointly with the upper and lower plates, the canals play a role of funnel-shaped collecting members. Axes of each six adjacent canals make 60° angle with one another and create a six-pointed star. An outlet funnel with reflective internal surface is provided at the canals connecting point, i.e. in the center of the six-pointed star. The beams coming out of the peripheral members of the receiving layers by means of the peripheral reflectors are transmitted to the intermediate reflectors via the reflective surface containing canals. The intermediate reflectors direct the received beams towards the funnel with internal reflective surface, which is disposed at the center of the six-pointed star. Each layer comprises the similar plates, and on each following layer, the distance from the center of the six-pointed star to the geometrical center of the hole coinciding the peripheral reflector of the six-pointed star exceeds with $\sqrt{7}$ times that on the preceding layer. An outlet funnel of the central six-pointed star in the group of stars arranged on each preceding layer is in coincidence with the center of the six-pointed star on each following layer, and the outlet funnels of six peripheral six-pointed stars in the group of stars arranged on the preceding layer are in coincidence with the peripheral reflectors.

In case of orthogonal arrangement of the receiving layer of the concentrator, an orthogonal matrix is created by the upper portions of the collecting members of both lenses containing and the paraboloidal-hyperboloidal reflectors containing concentrators.

The receiving layer members are grouped in such a manner, that eight adjacent squares are arranged around the central member. Reflectors containing layers are disposed under the beams receiving layer, each layer being composed of two plates. The lower plate of the layer comprises peripheral reflectors arranged along the axes of symmetry of the squares, and the upper plate comprises holes and intermediate reflectors arranged on a circle around the centre of a group. Distance from each following layer's group centre to the geometrical centre of the outlets coinciding the peripheral reflectors is three times more than that on the preceding layer.

The radiant energy concentrator operates in the following manner: the light beams incident upon the beams receiving layer are transmitted from the collecting members outlets to the lower layer's reflectors. The beams incident upon the peripheral reflectors from the receiving layer's peripheral members are reflected towards the intermediate reflectors. The beams directed to the centre by the intermediate reflectors are joined to the beam converged by the central member of the receiving layer. In the similar manner are collected also the beams coming out of each layer.

Not taking into account the loses, each layer having a hexagonal honeycomb structure, can perform seven-fold collection, and in case of orthogonal structuring it can make nine-fold collection.

Adding each layer, in case of hexagonal honeycomb structure, allows $\sqrt{7}$ times reduction in height remaining the original area of the construction; and 3 times reduction in height can be obtained in case of orthogonal arrangement.

The concentrated sunbeam can be transmitted to the unlit places by the sun by means of the internal reflective-surfaced containing tube and using its revertion process the beam can be expanded so as to decrease in expenduture of electrical energy during the daytime and improve the sanitary conditions of the places.

What is claimed is:

1. Radiant energy concentrator which comprises a light beam receiving layer in the form of a set of beam collecting members arranged on a same level, characterized in that:
   at least one layer is provided under and parallel to said receiving layer, said at least one layer being provided with reflectors;
   said collecting members of said receiving layer are grouped into a plurality of groups such that each group has a central member and peripheral members located adjacently to one another. and arranged about said central member;
   said reflectors are arranged such that a beam coming out of outlets of said peripheral collecting members are directed to intermediate reflectors arranged circumferentially around a center of each said group, said intermediate reflectors directing received beams to the outlet which is coincident with an axis of a center of said group;
   the outlets in each layer are grouped in a similar manner as that of said receiving layer such that peripheral reflectors of each following layer direct the beams coming out of the preceding layer's peripheral outlets to the respective intermediate reflectors which direct the received beams to the outlets coincident with the axis of the group center;
   and a distance between a group center and group periphery in each following layer exceeds that of each preceding layer.

2. A concentrator according to the claim 1, characterized in that said receiving layer is made in the form of a set of funnel-shaped members arranged in a hexagonal honeycomb manner and having beams reflecting working surfaces, and six peripheral reflectors from the group of reflectors arranged under the said receiving layer are connected with the intermediate reflectors arranged about the centre of the group by means of the canals having reflective surfaces and make six-pointed stars.

3. A concentrator according to the claim 1, characterized in that said light beams receiving layer is made as combination of orthogonally arranged paraboloidal-hyperboloidal concentrators.

4. A concentrator according to the claim 1, characterized in that said light beams receiving layer is made in the form of a set of orthogonally arranged collecting lenses.

5. A concentrator according to the claim 1, characterized in that said light beams receiving layer is made in the form of orthogonally arranged light collecting funnel-shaped members, above said funnel-shaped members square-shaped collecting lenses are provided, the optical axis of each of said lenses matching that of said funnel-shaped members, and the peripheral reflectors being provided on the layers which are arranged under said light receiving layer are connected with respective intermediate reflectors by means of the canals having reflective surfaces, the canals jointly making eight-pointed stars and a lens is in coincidence with each central member outlet and each layer central outlet.

6. A concentrator according to the claim 5, characterized in that lenses are in coincidence with outlets of light beams receiving layers peripheral members and with peripheral outlets of each layer.

7. A concentrator according to claim 4, characterized in that said lenses are the Fresnel lenses.

8. A concentrator according to claim 5, characterized in that said lenses are the Fresnel lenses.

9. A concentrator according to claim 1, wherein said at least one layer is a plurality of layers.

10. A radiant energy concentrator comprising:
    a light beam receiving layer having a set of beam collecting members arranged on a same level;
    at least one layer located under and parallel to said receiving layer, said at least one layer including reflectors;
    said beam collecting members are organized into a plurality of groups such that each group has a central member and peripheral members located adjacently to one another and arranged about said central member;
    wherein said reflectors are arranged such that a beam coming out of outlets of said peripheral collecting members are directed to intermediate reflectors arranged circumferentially around a center of each said group.

11. The concentrator according to claim 10, wherein said intermediate reflectors direct received beams to the outlet which is coincident with an a center of axis of said group.

12. The concentrator according to claim 11, wherein the outlets in each layer are grouped in a similar manner as that of said receiving layer such that peripheral reflectors of each following layer direct the beams coming out of the preceding layer's peripheral outlets to the respective intermediate reflectors which direct the received beams to the outlets coincident with the axis of the group center.

13. The concentrator according to claim 12, wherein a distance between the group center and group periphery in each following layer exceeds that of each preceding layer.

14. A concentrator according to claim 10, characterized in that said receiving layer comprises a set of funnel-shaped members arranged in a hexagonal honeycomb manner and having beams reflecting working surfaces and six peripheral reflectors from the group of reflectors arranged under said receiving layer are connected with the intermediate reflectors arranged about the center of the group by means of canals having reflective surfaces and make six-pointed stars.

15. A concentrator according to claim 10, characterized in that said light beams receiving layer comprises a combination of orthogonally arranged paraboloidal-hyperboloidal concentrators.

16. A concentrator according to claim 10, characterized in that said light beams receiving layer comprises a set of orthogonally arranged collecting lenses.

17. A concentrator according to claim 12, characterized in that said light beams receiving layer comprises orthogonally arranged light collecting funnel-shaped members and above said funnel-shaped members square-shaped collecting lenses are provided, the optical axis of each of said lenses matching that of said funnel-shaped members, and the peripheral reflectors provided on the layers arranged under said light receiving layer are connected with respective intermediate reflectors by means of canals having reflective surfaces, the canals arranged as eight-pointed stars, and a lens in coincidence with each central member outlet and each layer central outlet.

18. A concentrator according to claim 17, characterized in that lenses are in coincidence with outlets of light beams receiving layers peripheral members and with peripheral outlets of each layer.

19. A concentrator according to claim 16, characterized in that said lenses are Fresnel lenses.

* * * * *

UNITED STATES PATENT AND TRADEMARK OFFICE
CERTIFICATE OF CORRECTION

PATENT NO.     : 6,481,859 B1                                          Page 1 of 1
DATED          : November 19, 2002
INVENTOR(S)    : Aleksandre Moseshvili It is certified that error appears in the above-identified patent and that said Letters Patent is hereby corrected as shown below:

<u>Column 6,</u>
Line 24, change "an a center of" to -- a center --.

Signed and Sealed this

Eighteenth Day of March, 2003

JAMES E. ROGAN
*Director of the United States Patent and Trademark Office*